US009346304B2

(12) United States Patent
Peinze et al.

(10) Patent No.: US 9,346,304 B2
(45) Date of Patent: May 24, 2016

(54) SYSTEM AND METHOD FOR INDIVIDUALIZING SECURITY DOCUMENTS

(71) Applicant: BUNDESDRUCKEREI GMBH, Berlin (DE)

(72) Inventors: Franziska Peinze, Berlin (DE); Olga Kulikovska, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 0 days.

(21) Appl. No.: 14/406,284

(22) PCT Filed: Jun. 7, 2013

(86) PCT No.: PCT/EP2013/061810
§ 371 (c)(1),
(2) Date: Dec. 8, 2014

(87) PCT Pub. No.: WO2013/182682
PCT Pub. Date: Dec. 12, 2013

(65) Prior Publication Data
US 2015/0124020 A1    May 7, 2015

(30) Foreign Application Priority Data

Jun. 8, 2012  (DE) .......................... 10 2012 209 665

(51) Int. Cl.
*B41J 2/015* (2006.01)
*B41J 3/00* (2006.01)
(Continued)

(52) U.S. Cl.
CPC .................. *B41M 3/14* (2013.01); *B32B 3/266* (2013.01); *B32B 27/08* (2013.01); *B41J 2/01* (2013.01); *B42D 25/00* (2014.10); *B42D 25/29* (2014.10); *B32B 2425/00* (2013.01); *B41J 13/12* (2013.01); *B42D 25/346* (2014.10);
(Continued)

(58) Field of Classification Search
CPC ....................................................... B41M 3/14
See application file for complete search history.

(56) References Cited

U.S. PATENT DOCUMENTS 6,106,110 A * 8/2000 Gundjian et al. ............... 347/86
8,256,683 B2 * 9/2012 Von Fellenberg et al. .... 235/489
(Continued)

FOREIGN PATENT DOCUMENTS

DE    102007052847 A1    5/2009
DE    102010025044 A1    1/2010
(Continued)

*Primary Examiner* — Shelby Fidler
*Assistant Examiner* — Tracey McMillion
(74) *Attorney, Agent, or Firm* — Laurence A. Greenberg; Werner H. Stemer; Ralph E. Locher

(57) ABSTRACT

A method for individualizing a security document includes providing a document blank with a lamination body; printing on at least one outer surface of the lamination body with a digital printing device to introduce individualization information into the lamination body. The document blank with the lamination body has an outer layer in an individualization region with an outer material layer adjacent to the at least one outer surface formed with perforation openings penetrating the outer material layer to an information layer. The individualization information is printed onto the outer surface with at least some of the individualization information printed onto the information layer through the perforation openings. A system for individualizing documents is configured to print individualization information onto the information layer through the perforation openings.

12 Claims, 4 Drawing Sheets

(51) Int. Cl.
*B41M 3/14* (2006.01)
*B42D 25/29* (2014.01)
*B42D 25/00* (2014.01)
*B32B 27/08* (2006.01)
*B32B 3/26* (2006.01)
*B41J 2/01* (2006.01)
*B41J 13/12* (2006.01)
*B42D 25/346* (2014.01)

(52) U.S. Cl.
CPC ........ *B42D 2033/06* (2013.01); *B42D 2033/20* (2013.01); *B42D 2033/22* (2013.01); *B42D 2033/30* (2013.01); *B42D 2035/06* (2013.01); *B42D 2035/20* (2013.01)

(56) References Cited

U.S. PATENT DOCUMENTS

| | | | |
|---|---|---|---|
| 8,675,261 B2 | 3/2014 | Green | |
| 2010/0013210 A1* | 1/2010 | Wyssmann | 283/74 |

FOREIGN PATENT DOCUMENTS

| | | | |
|---|---|---|---|
| DE | 102008053582 B3 | | 4/2010 |
| DE | 102010023218 A1 | | 12/2011 |
| WO | 2010049124 A1 | | 5/2010 |
| WO | 2011015798 A1 | | 2/2011 |
| WO | WO2011015798 A1 | * | 2/2011 |
| WO | WO 2011015798 A1 | * | 2/2011 |
| WO | 2011161114 A1 | | 12/2011 |

* cited by examiner

SYSTEM AND METHOD FOR INDIVIDUALIZING SECURITY DOCUMENTS

BACKGROUND OF THE INVENTION

Field of the Invention

The invention relates to a method for individualizing a security document and to a system for individualizing documents. In particular, the invention relates to a method for individualizing security documents wherein colored, particularly preferably full-color individualization information is introduced into a security document.

From the prior art, it is known to provide security documents with information assigned individually to the respective security document. Individual information, which is also referred to as individualization information, is for example a serial number of the document. In the case of a multiplicity of security documents, it is furthermore conventional to store information about a person to whom the security document is assigned in the security document as individualization information. In the case of a passport, the individualization information comprises for example a name, a first name, a date of birth, a domicile, data relating to biometric features, such as a body height, an eye color, or a fingerprint pattern or a facial image, to mention a few personalization features.

The term security documents refers to documents which have at least one feature that makes imitation, copying and/or forgery or the like significantly more difficult or impossible. Security documents include, for example, passports, personal identification papers, identity cards, access cards, driver's licenses, visas, credit cards, postage stamps, securities, but also such entry cards, authentication seals or other forgery-protected packagings as are provided with security features, to list a few by way of example. Common to all of these is the fact that they comprise at least one security feature or security element, and typically a plurality of security features or security elements, which make forgery, imitation, copying and/or unauthorized production difficult or impossible.

DE 10 2008 053 582 B3 discloses a portable data carrier, for example a chip card, in which a security feature is produced by introducing recesses, filling the recesses with a translucent material and curing the translucent material, the translucent material containing constituents that can be excited by UV and or IR irradiation.

DE 10 2010 023 218 A1 describes a method for producing a security document having a watermark. A plurality of recesses are introduced into at least one opaque film, optionally a plurality of opaque films stacked on one another, which recesses do not extend fully through the at least one film, or the stacked films. The recesses lead to a reduction in the opacity. If the recesses have different depths, then different opacities can be achieved in the region of the differently deep recesses.

DE 10 2010 025 044 A1 discloses a method and an apparatus for producing a security document, as well as a security document. Holes are introduced into a substrate of a security document on the surface, and an ink is applied into these holes. This ink is preferably formed in such a way that it comprises colorants that diffuse into the substrate. The ink applied by printing technology is introduced more deeply into the document than an ink printed merely onto the surface, and is thus better protected against forgery and/or damage during use.

In order to obtain particularly forgery-proof security documents, the majority of these nowadays comprise a lamination body produced from a plurality of plastic layers. A multiplicity of different security features or security elements can be integrated into such a lamination body. For example, it is conventional to print onto parts or all of the surface of the individual plastic layers before assembly by means of a lamination method, and thereby to store the individualization information in the security document.

Particularly in embodiments in which the individual assembled plastic layers are made of the same thermoplastic material, in this way it is possible to provide almost monolithic lamination bodies which make manipulation of the stored individualization information very difficult. A prerequisite for this is, however, that the individualization information is stored on or in an inner layer, and a very good bond between the individual plastic layers is subsequently formed. This is generally possible only in large production systems, so that production of such security documents has to be carried out in a centralized way in one or a few production facilities.

From the prior art, however, apparatuses with which individualization information can be stored decentrally are also known. In this case, the individualization information is typically printed onto an outer surface of a document blank. The printing is generally performed by means of thermal transfer printing or inkjet printing, and may be carried out in color. It is likewise known to use UV-curing printing preparations for this purpose. In order to make manipulation of the printed individualization information difficult, the printed information is covered with a further film or a layer of lacquer coating. Such a further film is, for example, laminated onto the document blank. In a decentralized device, however, it is not possible to achieve the temperatures and pressures which would be necessary to bond such a film to the rest of the document blank in order to form a monolithic body. In addition, it is known to apply holograms on part or all of the surface over the individualization information.

A disadvantage with the known methods is, however, that the protective layers can often be removed nondestructively, so that the printed individualization information can subsequently be forged, or even fully removed and replaced. In many cases, either the protective layer can subsequently be replaced by an identical new protective layer, or the protective layer previously removed can be reapplied. Decentrally individualized security documents therefore generally have very much less security, in particular in relation to subsequent adulteration.

BRIEF SUMMARY OF THE INVENTION

It is therefore the object of the invention to provide an improved method for individualizing security documents, in particular for the decentralized individualization of security documents, with which preferably colored, particularly preferably full-color, individualization information can be stored in the security document, which has almost the same security in relation to adulteration as a security document produced in a central individualization apparatus. It is furthermore the object of the invention to provide a system with which such decentralized individualization is possible.

The invention is based on the concept of providing security document blanks in such a way that they comprise a lamination body in which a multiplicity of security features are already integrated. The lamination body is formed and provided in such a way that, on an outer surface, at least in an individualization region provided for the individualization, it has perforation openings in a material layer adjacent to the outer surface, these openings extending through the material layer up to an information layer in the interior of the lamination body. The information layer has graphically perceptible information at least in the individualization region. The individualization information is now applied onto the outer surface in such a way that at least a part of the individualization information is printed through the perforation openings onto the information layer lying in the interior. Manipulation of the individualization information applied in this way is scarcely possible. Since the outer material layer, adjacent to the outer surface, of the lamination body provided is bonded to the underlying information layer in a centrally performed lamination method, the information layer and the overlying outer material layer provided with the perforation openings can be bonded together to form a monolithic lamination body, so that separation of the lamination body at the layer boundary originally existing in the production process, between the information layer and the outer substrate layer, is impossible. By printing at least part of the individualization layer onto the information layer, the latter is modified. This makes it difficult to manipulate the individualized security document blanks or finished security documents, since demerging or full or partial erosion of the material layer provided with the perforation openings, and subsequent replacement with a new material layer, is not possible without being noticed. On the one hand, the information layer is modified by the individualization information. On the other hand, alignment of the perforations of the new material layer with the information layer, in such a way that the new perforations are all arranged at the same positions as the original perforations, is difficult or impossible. If the alignment and arrangement are not perfect, then there will typically be components of the original individualization information at positions where no "new" perforations are formed. Furthermore, the old individualization information cannot generally be printed over fully by components of the forged and therefore "new" individualization information, or integrated therein in the sense of a meaningful addition.

DEFINITIONS

A security feature is a feature which makes forgery, imitation or unauthorized production of an object difficult or impossible.

A security element is an entity which has at least one security feature. In the sense of this definition, each security document also constitutes a security element.

A monolithic lamination body is considered to be a body produced from a plurality of different layers, in which the individual substrate layers are bonded to one another in such a way that, on account of the chemical structure, the layer boundaries existing before the lamination are no longer detectable as phase transitions in the finished lamination body. The person skilled in the art will understand that the originally existing different substrate layers in the finished lamination body may, for example, be determined by means of the different admixtures of additives, which the substrate layers used to produce the lamination body contained before the lamination. A lamination body which is assembled from a plastic layer, colored through its volume by means of color pigments, and a transparent, color-neutral plastic layer, to form a monolithic lamination body, has different material layers in the finished lamination body, which exhibit different properties in relation to interaction with light. In respect of the chemical polymer structure, however, a phase transition cannot be identified in a monolithic lamination body.

A substance or preparation is regarded as colored if it induces a color impression for a human observer. Black and gray-scale tones are not regarded as colored in this context. An object is regarded as chromatic if it induces two different color impressions for a human observer. An object is referred to as full-color if it comprises a multiplicity of color impressions from a spanned gamut, which is spanned by three primary colors. For example, printing that is produced with a multicolor printing system, which comprises for example the colors cyan, yellow and magenta as primary colors, is regarded as full-color. A prerequisite is, of course, that the information to be printed is itself configured in color.

Individualization information refers to any information which is assigned individually to a security document to be produced. This means that this information differs for differently produced security documents. Personalization information refers to individualization information assigned to a person to whom the security document produced, or to be produced, is assigned.

A digital printing device means a printing device which is intended for printing information in such a way that different information can in each case be printed on successively manufactured printed articles, without the throughput of the printing device being significantly reduced by this or setup times even being necessary. Inkjet printers, or alternatively plotters, represent digital printing devices. The printed image may in each case be established with the aid of a digital file. Further digital printing devices print, for example, by a transfer printing method.

An information layer is a layer which comprises graphically perceptible information at, in or on a surface. An information layer may be printed layer on a substrate, in particular a plastic film. An information layer may likewise be formed also in a body, for example a film, which is structured in its volume in such a way that graphically perceptible information is stored on the surface which forms the information layer. For example, a film may be produced by means of extrusion from differently colored plastic materials, so that a colored pattern is graphically perceptible on the surface of the film. In this context, graphically perceptible means that the pattern is visually perceptible by a human observer, or can be recorded and stored by means of a photographic process. To this end, it may be necessary to use suitable illumination conditions and/or observation/recording conditions. Thus, the information layer may also comprise diffractive structures, such as a kinegram or a hologram, or the like.

PREFERRED EMBODIMENTS

In particular, a method for individualizing a security document is proposed, which comprises the steps: providing a document blank, the document blank comprising a lamination body; providing a digital printing device; printing on at least one outer surface of the lamination body by means of the digital printing device in order to introduce individualization information into the lamination body; wherein the document blank is provided with a lamination body which, at least in an individualization region in an outer material layer adjacent to the at least one outer surface, has a multiplicity of perforation openings extending through the outer material layer up to an information layer, and the individualization information is printed onto the outer surface in such a way that at least part of the individualization information is printed through the perforation openings onto the information layer.

The perforation openings preferably have diameters in the micrometer range. Perforation openings with a diameter in the range from 20 µm to 200 µm are particularly preferred. The diameters more preferably lie in the range from 30 µm to 70 µm, and most preferably in the range of 50 µm+/−10 µm. These values refer to the opening sizes before the lamination. After the lamination, they may be smaller. With such a selection, the diameters of the individual microperforation openings correspond approximately to the size of the individual image pixels when the printing of the individualization information is carried out with a printing resolution of about 600 dpi. In one preferred embodiment, the diameters of the microperforation openings on the outer surface should be selected in such a way that they are of the order of the diameter of a pixel.

A depth of the perforation openings, or a layer thickness of the outer material layer between the information layer and the outer surface of the lamination body, respectively, preferably lies in a range of between 30 μm and 200 μm.

Lamination bodies in which the perforation openings in the individualization region are arranged in a regular grid have proven particularly suitable. This provides the possibility of storing almost any desired information in the security document to be produced, merely by way of the individualization information component which is printed onto the information layer. Likewise, almost any desired individualization information can be printed on in such a way that one component is stored on the outer surface and another component on the information layer. A prerequisite is, however, that the perforation openings form a grid in which the spacings of the perforation openings are small compared with the extent of the printed information structures.

Preferably, a grid is formed in such a way that the centers of the perforation openings have a spacing from one another which lies in the range from 1.2 times to 3 times the diameter of the perforation opening on the outer surface preferably in the range from 1.3 times to 1.4 times the diameter, and most preferably is 1.4 times the diameter.

In such an embodiment, the perforation openings occupy about 40% of the outer surface in the region of the regular grid. Such a surface fraction of the openings can be implemented without restricting the stability of the lamination body in the individualization region.

In one embodiment, it is provided that at least the component which is printed onto the information layer through the perforation openings is printed with pixel accuracy into perforation openings by means of a preparation. In such an embodiment, all of the individualization information may be printed with pixel accuracy onto the information layer. In such a case, the outer material layer is preferably formed transparently and color-neutrally.

Likewise, in other embodiments, it is possible for the individualization information to be applied onto the individualization region over its entire surface, so that one part of the individualization information is printed onto the outer surface and one part of the individualization information is printed through the perforation openings onto the information layer. The individual information components, for example components of a facial image, are then stored in different planes of the security document produced, while being correlated to one another. This may be used for purposes of verifying the security document. Even if the information component applied onto the outer surface, which is more accessible for manipulation, is forged, this can be identified in that the correlation between the component applied on the outer surface and the component of the individualization information which is applied onto the information layer through the perforation openings no longer fully exists.

The individualization information may be applied onto the individualization region over part of its surface, in such a way that one part of the individualization information is printed onto the outer surface and one part of the individualization information is printed through the perforation openings onto the information layer, but part of the outer surface remains unprinted. In many embodiments, the information layer also remains unprinted in the region of a few perforation openings.

Particularly preferably, the individualization information is printed on by means of an inkjet printing method by means of one or more preparations. Inkjet printing devices are capable of printing individual pixels in a controlled way with a preselected color by means of a preparation. By means of this it is possible, for example, to print the preparation into the individual perforation openings with pixel accuracy. Furthermore, by using three preparations, which in each case lead to the color impression of a primary color in the printed state, it is possible to print full-color individualization information, all color impressions in a gamut spanned by the primary colors being usable for representation of the individualization information by color subtraction.

However, inkjet printing devices in which, in addition to the color preparations which impart a color impression of a primary color, further preparations can be used, which induce for example a black color impression or can additionally induce further color impressions not lying in the gamut, are particularly preferred.

It is particularly advantageous for the individualization information to be combined with a security imprint, which is applied onto the information layer during the production of the lamination body. Particularly preferably, the document body can therefore be provided with a security imprint on the information layer. The individualization information component which is printed through the perforation openings onto the information layer is therefore connected to the security imprint on the information layer. If a forger succeeds in removing components of the individualization information printed onto the information layer, then this likewise leads to modification and/or damage of the security imprint. In order to be able to identify the security imprint in the overprinted region, it is for example possible to use preparations which are translucent or transparent in the printed state, so that parts of the security imprint are perceptible through the individualization information as before, in spite of an overprinting.

A particularly good connection to the security imprint is established when using preparations, the colorants of which diffuse at least partially into the material on which they are printed. In one embodiment, therefore, the individualization information is printed by means of at least one preparation which comprises a solvent that attacks the material of the outer material layer and/or of the information layer, so that diffusion of colorants of the preparation into the walls of the perforation openings in the outer material layer and/or the information layer is promoted. An inseparable bond between the individualization information printed on and the respective material layer receiving the information may also be achieved in that, or additionally in that, the preparation is produced on the basis of the same plastic material as that from which the respective material layer or the material layers are produced.

For example, when polycarbonates are used for the information layer and the outer material, materials produced on the basis of polycarbonate are suitable. Such preparations are described, for example, in DE 10 2007 052 947 A1.

DE 10 2007 052 947 A1 teaches the use of a preparation containing: A) from 0.1 to 20 wt % of a binder with a polycarbonate derivative based on a germinally disubstituted dihydroxydiphenyl cycloalkane, B) from 30 to 99.9 wt % of a preferably organic solvent or solvent mixture, C) from 0 to 10 wt %, expressed in terms of dry mass, of a colorant or colorant mixture, D) from 0 to 10 wt % of a functional material or a mixture of functional materials, E) from 0 to 30 wt % of additives and/or auxiliaries, or a mixture of such substances, the sum of components A) to E) always giving 100 wt %, as an inkjet printing ink.

In respect of the specific configuration, reference is made to the cited laid-open specification, which is hereby fully incorporated as part of this application.

In order to promote penetration of the preparation into the perforation openings and in the direction of the information layer, and to modify the outer surface as minimally as possible, in one embodiment the perforation openings are formed in such a way that they widen conically from the outer surface of the to the information layer. Additional effects can likewise be achieved in this way, since under perpendicular observation there is a planar overlap of the ring segment enclosing the perforation opening on the outer surface with a ring segment on the information layer at the edge of the perforation opening, the opening diameter of which is greater on the information layer because of the conical widening.

In this way, observation angle-dependent effects can be obtained when tilting the lamination body. The reason is a change in the overlap regions.

The individualization information is particularly preferably printed in full color. Particularly preferably, the individualization information comprises a facial image of a user, to whom the security document is assigned.

In order to protect the individualization information printed onto the outer surface against manipulation and/or damage, in a preferred embodiment a cover layer or substrate layer which is at least partially printed through the perforation openings on to the information layer inside the lamination body is applied onto the outer surface after the printing of the individualization information. This cover layer or substrate layer may, for example, be applied and formed as a lacquer coating layer. A transparent color-neutral coating is preferably used therefor. Likewise, it is possible to laminate a transparent film onto the lamination body. Typically, however, it is not possible to reach the pressures or temperatures which will be necessary to achieve monolithic bonding of the outer protective layer to the rest of the lamination body provided by means of the document blank. The perforated outer layer additionally promotes bonding of the outer protective layer to the laminate body. Lacquer or adhesive, respectively, can penetrate into the openings. The bonding area is thereby increased. The penetration of lacquer or adhesive, respectively, into the perforation openings prevents subsequent overprinting of the individualization information on to the information layer.

Besides the perforation openings described above, which widen conically from the outer surface in the direction of the information layer, other geometries are also provided for the perforation openings in some embodiments. They may have a cylindrically or conically tapering shape. In terms of a cross-sectional shape parallel to the outer surface, the perforation openings may be configured so as to be circular, oval, triangular, square, polygonal, for example star-shaped, hexagonal, etc. The various cross-sectional shapes and geometries may be combined with one another in any desired way. Perforation openings of different configuration may be combined with one another in one lamination body. Inwardly widening perforation openings are preferred, since these are particularly difficult to introduce subsequently during forgery.

According to one aspect of the invention, a preferred system for decentralized personalization or individualization of documents is proposed. Such a system for individualizing documents comprises: one or more document blanks having a lamination body; and the digital printing device, the lamination body displaying a multiplicity of perforation openings in an outer material layer adjacent to the outer surface, and which extend through the outer material layer adjacent to the outer surface up to an information layer, and the printing apparatus being formed in such a way that it prints at least a part of the individualization information through the perforation openings onto the information layer.

The system preferably comprises a control device, which is formed in order to receive individualization information, for example in the form of an electronic data set, and to drive the printing apparatus. The printing apparatus is preferably formed as an inkjet printing apparatus. It is particularly preferably capable of printing a plurality of preparations, each of which induces a different color impression in the printed state. In total, a system is thus provided which can decentrally personalize security documents in a smaller batch number than is usual in large installations. The technical outlay for these systems, and particularly in terms of the capital costs required therefor, can be kept so low that they can be employed decentrally. The security documents provided with the individualization information are nevertheless to be categorized in terms of forgery security in a similar way as security documents produced in a centralized production device. Such systems are suitable in particular for the personalization of security documents, in which throughputs of less than 200 documents per hour are intended. Such a system may additionally display a lamination device or a coating device. A lacquer coating layer may likewise be applied on the fully individualized lamination bodies with an inkjet printing method or any other desired printing method.

The individualized security documents produced in this manner may, on the one hand, be security documents which are configured as plastic cards. Likewise, however, security documents which are configured for example as a pass book, in which a lamination body is incorporated as one page, may also be personalized in this way.

BRIEF DESCRIPTION OF THE SEVERAL VIEWS OF THE DRAWINGS

The invention will be explained in more detail below with reference to a drawing, in which:

FIG. 2b shows a schematic view of a security document, which is obtained after the application of a protective layer onto the lamination body according to FIG. 2a;

DESCRIPTION OF THE INVENTION

Figure 1:
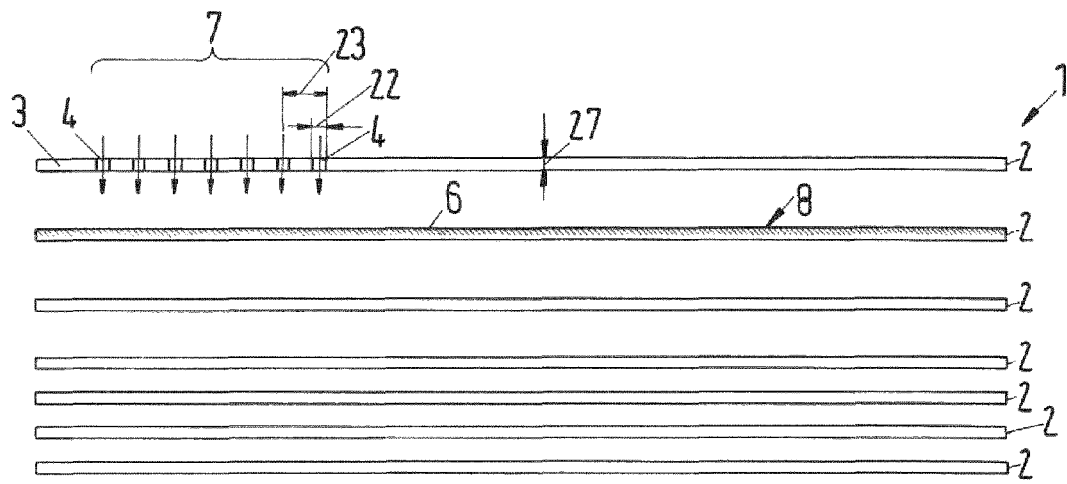
FIG. 1 shows a schematic representation of a plurality of substrate layers, which are assembled to form a lamination body of a document blank.

FIG. 1 schematically represents a stack 1 of substrate layers 2. These are assembled in a high-pressure, high-temperature lamination method to form a lamination body. The substrate layers 2 are preferably all made of the same plastic material, for example a polycarbonate material. As an alternative, the substrate layers may also be produced from a different plastic material, for example PVC, ABS, TPU, PET, or the like. The substrate layers 2 are preferably all from the same plastic material. Other embodiments may also provide, however, that the individual substrate layers 2 are made from various plastic materials. The individual substrate layers 2 may have different colors and admixtures of additives. Furthermore, the surfaces may be printed individually. It is furthermore possible to insert further security features (not represented) and/or emboss security features between the substrate layers.

An outer substrate layer 3 is preferably transparent and color-neutral, and displays a multiplicity of perforation openings 4 in a region 7 intended for later individualization. These perforation openings 4 extend fully through the outer substrate layer 3, and therefore constitute through-openings. The perforation openings 4 preferably have diameters 22 of the order from 20 μm to 200 μm, particularly preferably in the range of 50 μm. The perforation openings 4 are preferably arranged in a regular, or specific, grid. In some embodiments, the perforation openings are arranged in such a way that together, by means of their arrangement, they represent a pattern, for example a logo, character or the like. The spacings 23 of the centers 24 preferably lie in the range from 50 to 300 μm, particularly preferably in the range of 70 μm, in the case of a diameter 22 of the perforation openings 4 of 50 μm. The opening sizes and spacings represented are not true to scale. A substrate layer thickness 27 of the outer substrate layer 3 preferably lies in the range of between 50 μm and 200 μm, preferably in the range of about 50 μm to 100 μm.

A so-called information substrate layer 5 is arranged adjacent to the outer substrate layer 3 in the stack 1. It has a security imprint 6 on an upper side 8. Typically, a security imprint 6 comprises a guilloche pattern or the like. The security imprint 6 may be embodied in full color.

When the substrate layers 2 of the stack 1 are assembled, they are assembled to form a lamination body 11, which forms a document blank 10. One of these is represented schematically in FIG. 2a. Perforation openings 14 are in this case open in relation to a surface 19 of a document body 11. They extend through an outer material layer 13, the layer thickness 21 of which corresponds approximately to the substrate layer thickness 27 of the outer substrate layer 3 (cf. FIG. 1). The opening diameter may be modified by the lamination in such a way that the size of the openings 14 in the card body does not correspond exactly to that of the perforation openings 4 in the original substrate layer. The opening shape may also be modified during the lamination. The perforation openings 14 extend through the outer material layer 13, which has been formed from the outer substrate layer 3, fully up to an information layer 15, on which the security imprint 16 is formed. The security imprint is not modified or damaged on account thereof. The information layer 15 has been created from the information substrate layer 5. The security imprint 16 is represented as a dashed line. It should be mentioned at this point that the individual substrate layers 2 (cf. FIG. 1) are assembled to form a monolithic lamination body 11 in which, in terms of the plastic structure, no phase transitions can be seen at any position where there were originally substrate layer boundaries of the substrate layers 2 in the stack 1. Alternative embodiments, in which the lamination body is not formed monolithically, are possible. In these embodiments, the lamination body may be produced from substrate layers which are produced on the basis of various plastic materials.

In an individualization region 17, individualization information 18 is printed onto an outer surface 19 of the lamination body 11. This is preferably done by means of a digital printing method, in particular an inkjet printing method. Individual pixels are printed onto the outer surface 19 of the lamination body 11 with different preparations. One part 18-1 of the individualization information is in this case printed onto the information layer 15 through the perforation openings 14. This means that the preparation used penetrates into the microperforation openings 14 and, for example, is conducted to the information layer 15 by means of a capillary effect. There, part 18-1 of the individualization information 18 is therefore connected to the security imprint 16. A further part 18-2 of the individualization information remains on the outer surface 19, so to speak on the webs between the microperforation openings 14. The individualization information 18 is therefore stored in two different planes of the lamination body 11.

In one embodiment, the one part 18-1 of the individualization information is printed into the microperforation openings 14 with pixel accuracy. In one embodiment, provision may be made for only the one part 18-1, which is printed into the microperforation openings 14 with pixel accuracy, to be used as individualization information 18. In this case, there are therefore no information components which remain on the outer surface 19, i.e. the webs between the microperforation openings 14.

The preparations used may preferably be configured in such a way that the resulting color impression of the entire individualization information 18 is in full color. The preparations therefore preferably comprise at least three preparations, which in the printed state in each case induce a color impression of a primary color of a color system for a human observer. Furthermore, the preparations are preferably formed in such a way that the configured pixels, particularly in the region of the microperforation openings 14, are translucent, so that part of the security imprint 16 also remains visible in the region of the microperforation openings 14 through the part 18-1 of the individualization information which is printed onto the information layer 15. On account thereof, optimal connection of the individualization information 18 to the security imprint 16 is achieved.

In particular, it is advantageous for the outer material layer 13 to be configured to be transparent and color-neutral, so that the security imprint can be seen through the outer surface 19. This applies at least to the regions which are not opaquely printed.

Preparations which contain a solvent component that partially dissolves the plastic of the outer material layer 13 and/or of the information layer 15 are preferably used. On account thereof, diffusion of colorants of the preparation into the material of the outer material layer 13, possibly including the walls 26 of the perforation openings 14, and of the information layer 15 is reinforced and/or induced.

In order to achieve good connection of the individualization information 18, in particular to the security imprint 16, the preparations are preferably produced on the basis of the plastic material from which the outer material layer 13 and/or the information layer 15 are/is produced.

Figure 2A:
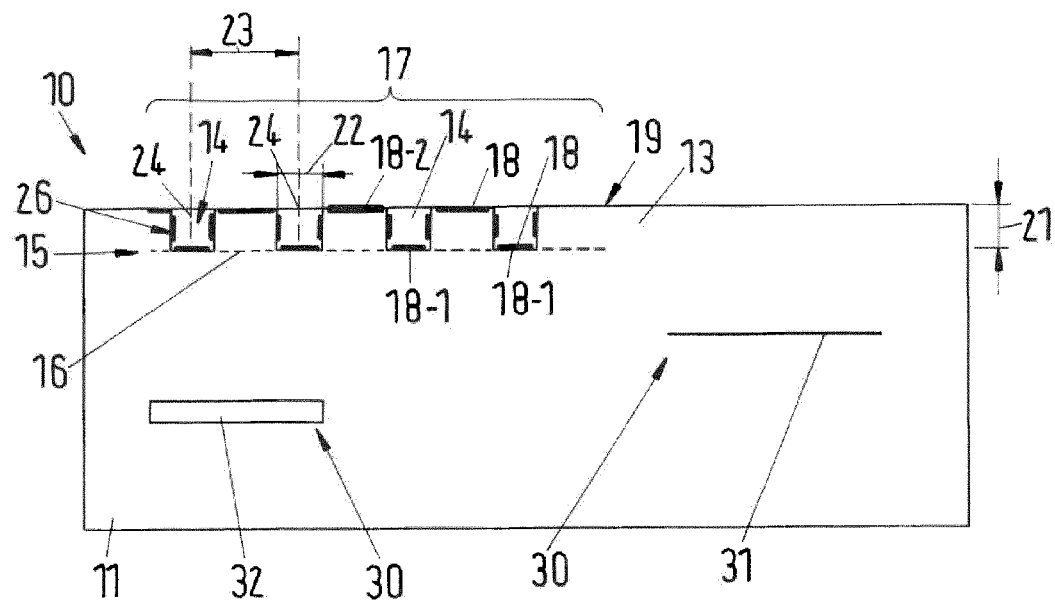
FIG. 2a shows a schematic view of a lamination body in the cross section.
Figure 2B:
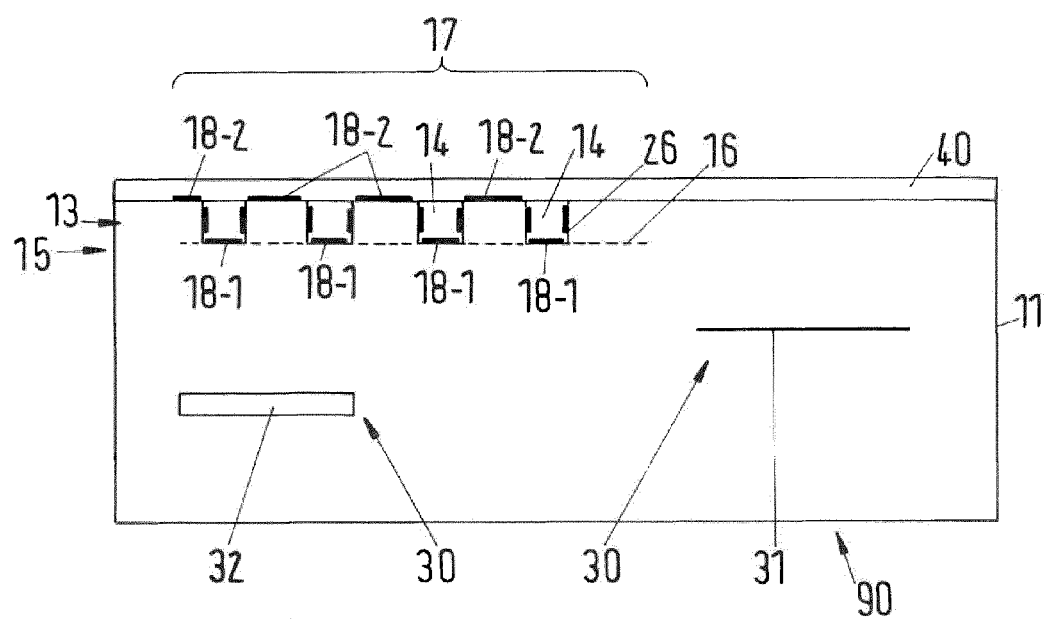

In FIG. 2a, it can be seen clearly that further security elements 30, for example a hologram 31 and a microchip 32, can be integrated into the lamination body 11. These are mentioned merely as exemplary security elements 30.

In order to protect the applied individualization information 18, in particular the further part 18-2 which is stored on the outer surface 19 of the lamination body 11, from mechanical damage and/or manipulation, a lacquer coating layer 40 is applied onto the outer surface 19, which may be applied in such a way that the perforation openings 14 are filled with the lacquer. In this way, a smooth surface of the finished document body 80 is obtained. In the embodiment represented, the document body 80 itself is the security document 90. In other embodiments, the document body 80 may be stitched into a pass book which represents the finished security document.

Figure 3:
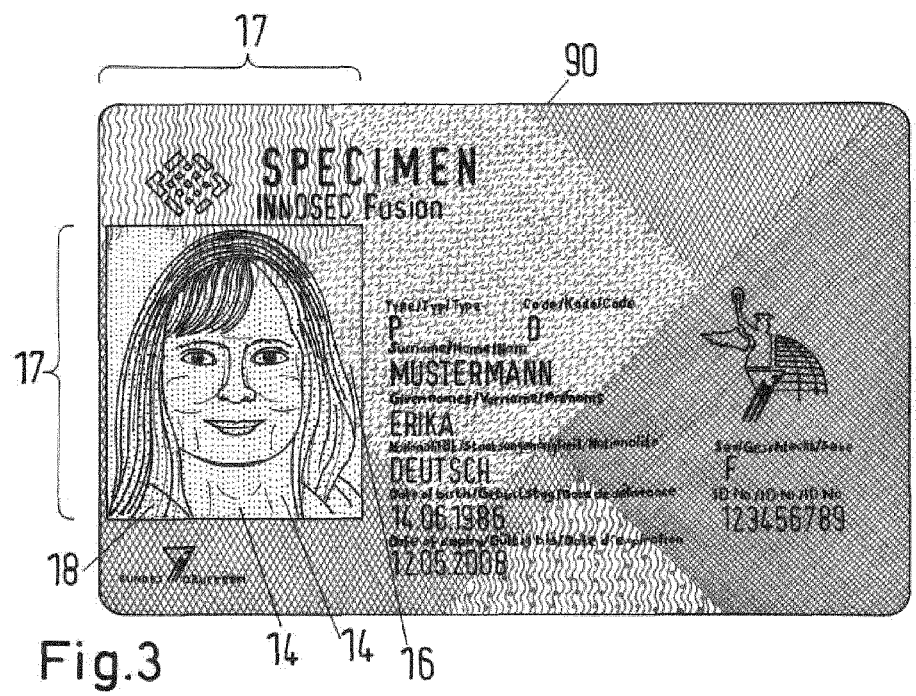
FIG. 3 shows a schematic plan view onto a security document provided with individualization information.

FIG. 3 represents a schematic plan view of a security document 90 configured as a card. It can be seen that a facial image, which is preferably formed in full color, is formed in an individualization region 17. A grid of perforation openings 14 is indicated schematically. Part of the individualization information 18 in the form of the facial image is therefore printed through the perforation openings 14 onto an information layer, on which a security imprint 16 is applied. The perforation openings need not exist over the entire region on which the individualization information is applied. Preferably, however, the perforation openings extend over the entire region on which the individualization information is applied, in order to secure all the individualization information adequately by way of storing an information component on the information layer.

Figure 4:
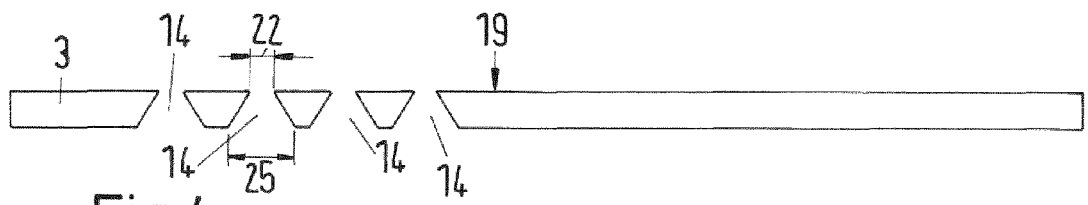
FIG. 4 shows a schematic side view through a substrate layer, which may be processed as the top layer with other substrate layers to form a lamination body.

FIG. 4 shows a further substrate layer into which perforation openings, which widen conically starting from the outer surface 19, are introduced. A diameter 22 on the outer surface 19 is therefore less than a diameter 25 of the perforation openings 14, which will be adjacent to the information layer 15 in the finished lamination body 11

Other embodiments may be configured differently, for example display cylindrical perforation openings.

Figure 5A:
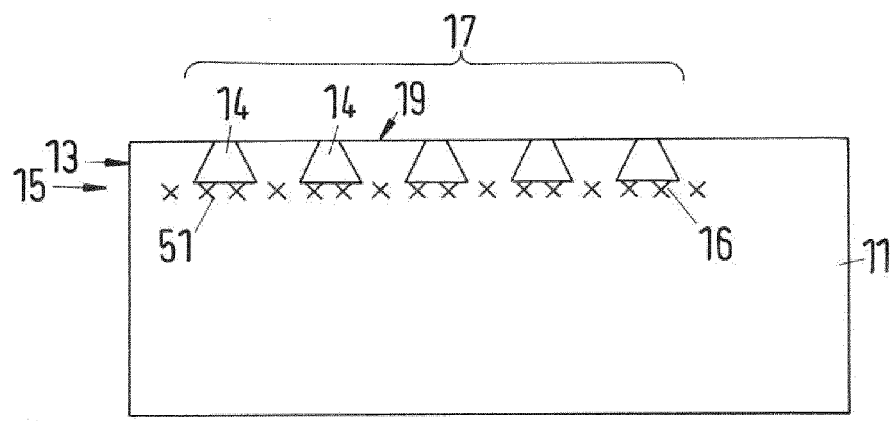
FIG. 5a shows a schematic view in the cross section of a lamination body with a security imprint before individualization.
Figure 5B:
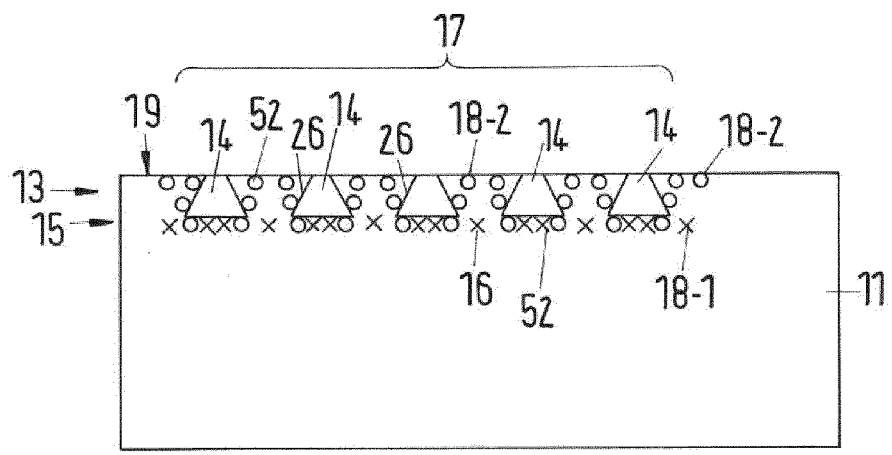
FIG. 5b shows a schematic view in the cross section of the lamination body according to FIG. 5a, after the application of individualization information.
Figure 5C:
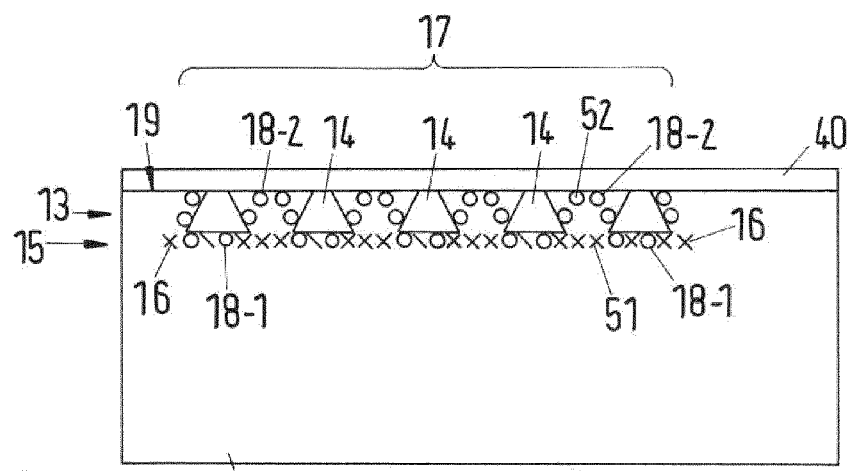
FIG. 5c shows a schematic view in the cross section of a finished security document.

FIG. 5a schematically represents a lamination body in which the perforation openings widen conically from the outer surface 19 in the direction of the information layer. A security imprint 16, which is indicated by means of crosses 51, is applied on the information layer 15. The individual colorants indicated by the crosses 51 have diffused into the information layer 15. In FIG. 5b, the lamination body is represented after the individualization information 18 has been printed on. The colorants of the individualization information 18 are indicated by circles 52. It can be seen that these colorants also have diffused on the outer surface 19 into the top material layer 13 as well as the information component 18-1, which is printed onto the information layer 15. On account thereof, optimal connection of the individualization information to the security imprint takes place. Furthermore, there is a correlation between individual pixels which are printed through the perforation openings 14 onto the information layer 15, and those pixels which are configured on the outer surface 19 of the top material layer 13. FIG. 5c in turn shows a finished security document 90 in which a lacquer coating layer 40 is again applied onto the outer surface 19 of the lamination body 11 of the document blank 10. This lacquer coating layer may be applied in such a way that the perforation openings are not filled, or almost not filled, or fully filled or only partially filled. In in each case, a smooth surface of the coating layer is sought. As an alternative, an outer protective layer may be applied.

Figure 6:
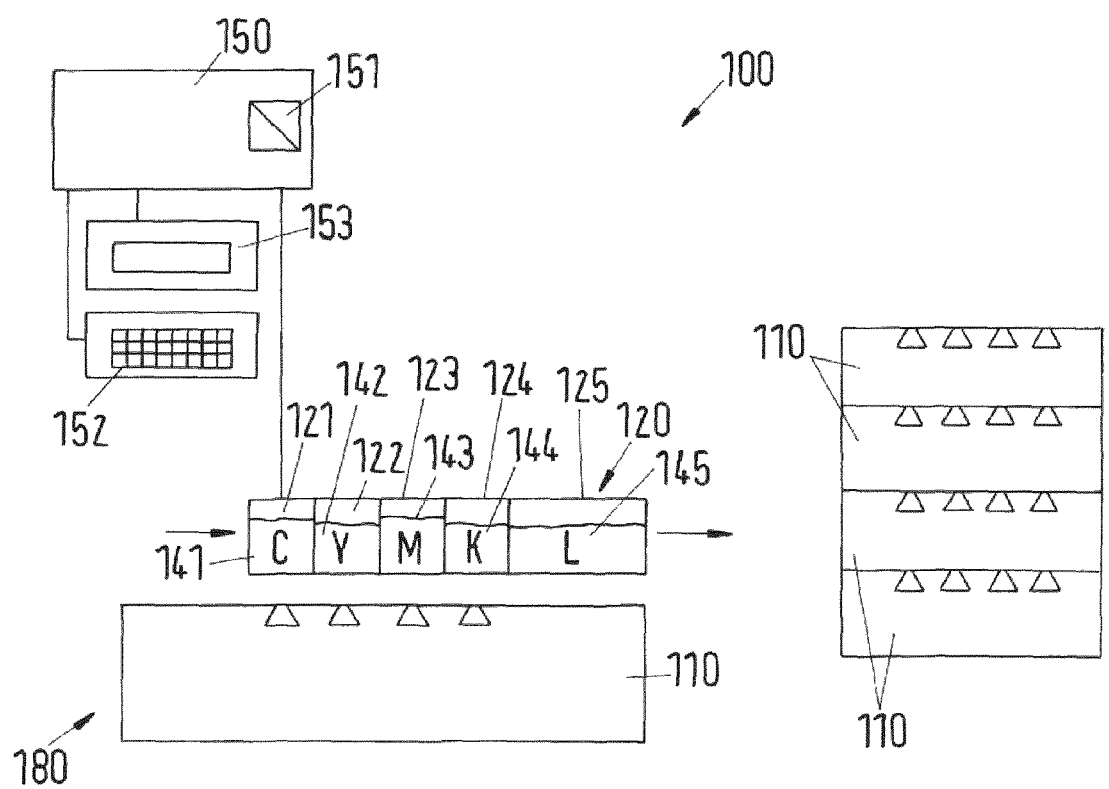
FIG. 6 shows a schematic view of a system for the decentralized individualization of security documents.

FIG. 6 schematically represents a system for individualizing security documents. The system 100 comprises a plurality of documents blanks 110. One of these document blanks 110 is inside a digital printing device 120, which is formed as an inkjet printing device 120. The latter comprises a plurality of reservoirs 121-125, some of which have preparations 141-144 that in each case induce a different optical impression in the printed state for an observer. The preparations 121-123 represent, for example, preparations which represent the primary colors cyan, yellow and magenta in the printed state. One preparation 144 is provided in order to induce a black impression for the user in the printed state. A last reservoir 125 is filled with a transparent color-neutral lacquer coating material 145. The printing device 120 is controlled by way of a control device 150. The control device 150 comprises an interface 151 for receiving the individualization information, for example in the form of a data set. Alternatively, the individualization information may be entered via an input device which is configured as a keyboard, for example. For monitoring of the individualization information, a display apparatus 153 is provided, for example. The control device 150 controls the digital printing device 120, configured as an inkjet printing device, in order to apply the individualization information in a controlled way onto the outer surface 19 of the document blank 110 inside the inkjet printing device. In this case, one part of the individualization information is applied in such a way that the preparations 141-144 are printed through the microperforations 14 onto an information layer 15, which is already provided with a security imprint 16. After the application of the individualization information, in this embodiment the lacquer coating material 40 is applied onto the outer surface 19 of the document blank 110, likewise by means of the inkjet printing apparatus, so that a finished security document 180 is provided.

The person skilled in the art will understand that the embodiments are described merely by way of example. The individual features described in the various embodiments may be used in any desired combination, in order to carry out the invention.

LIST OF REFERENCE SIGNS 1 stack
2 substrate layers
3 outer substrate layer
4 perforation openings
5 information layer
6 security imprint
7 individualization region
8 upper side of the information layer
10 document blank
11 lamination body
13 outer material layer
14 perforation openings
15 information layer
16 security imprint
17 individualization region
18 individualization information
18-1 part of the individualization information
18-2 further part of the individualization information
19 outer surface
21 layer thickness
22 diameter
23 spacing
24 centers
25 diameter (on the information layer)
26 walls
27 substrate layer thickness
30 security elements
31 hologram
32 microchip
40 lacquer coating layer
51 colorant of security imprint (cross)
52 colorant of individualization information (circle)
80 document body
90 security document
100 system 110 document blank
120 inkjet printing device
121-125 reservoirs
141-144 preparations
145 lacquer coating material
150 control device
151 interface
152 input apparatus
153 display apparatus
180 security document

The invention claimed is:

1. A method of individualizing a security document, the method comprising:
   providing a document blank with a lamination body, the lamination body, at least in an individualization region of an outer material layer adjacent at least one outer surface, being formed with a multiplicity of perforation openings extending through the outer material layer up to an information layer, the information layer containing graphically perceptible information in the individualization region;
   providing the lamination body with a security imprint on the information layer;
   providing a digital printing device; and
   printing, by way of the digital printing device, individualization information onto an outer surface of the lamination body and printing at least a part of the individualization information through the perforation openings onto the information layer to thereby modify the graphically perceptible information of the information layer;
   wherein the printing is performed such that the individualization information cannot be removed without damaging the graphically perceptible information present in the inner information layer prior to the printing of the individualization information.

2. The method according to claim 1, wherein the perforation openings are micro-perforations with a diameter on the outer surface in a range from 20 μm to 200 μm.

3. The method according to claim 2, wherein the micro-perforations have a diameter in a range from 30 μm to 70 μm.

4. The method according to claim 2, wherein the micro-perforations have a diameter of 50 μm+/−10 μm.

5. The method according to claim 1, wherein the perforation openings have centers disposed at a spacing distance from one another in a range from 1.2 times to 3 times a diameter of the perforation openings on the outer surface.

6. The method according to claim 5, wherein the spacing distance between the centers of the perforation openings lies in a range from 1.3 times to 1.5 times the diameter.

7. The method according to claim 1, which comprises providing the lamination body with perforation openings that widen conically from the outer surface in a direction towards the information layer.

8. The method according to claim 1, which comprises printing the individualization information with at least one preparation containing a solvent and colorants, wherein the solvent attacks a material of one or both of the outer material layer and/or the information layer, so as to promote a diffusion of colorants in the at least one preparation into one or more of the outer material layer, walls of the perforation openings in the outer material layer, and/or the information layer.

9. The method according to claim 8, which comprises printing the at least one component of the individualization information with pixel accuracy into perforation openings with the at least one preparation.

10. The method according to claim 1, which comprises printing the individualization information with a plurality of preparations, so that the individualization information is formed partially on the outer surface and partially on the information layer.

11. The method according to claim 10, which comprises printing the individualization information in full color.

12. The method according to claim 1, wherein the multiplicity of perforation openings do not extend into the information layer.

* * * * *